United States Patent [19]

Swallow

[11] 4,338,107
[45] Jul. 6, 1982

[54] WASH SYSTEM GAS SEPARATION

[75] Inventor: Brian R. Swallow, Grand Island, N.Y.

[73] Assignee: Union Carbide Corporation, Danbury, Conn.

[21] Appl. No.: 202,238

[22] Filed: Oct. 30, 1980

[51] Int. Cl.³ .......................... F25J 3/00; B01D 47/00
[52] U.S. Cl. ............................................ 62/17; 62/31; 62/24; 62/40; 55/68
[58] Field of Search .................. 55/68; 62/17, 24, 27, 62/28, 40, 38

[56]  References Cited
U.S. PATENT DOCUMENTS

| | | |
|---|---|---|
| 1,773,012 | 8/1930 | Schuftan . |
| 2,591,658 | 4/1952 | Haringhuizen ..................... 62/175.5 |
| 3,453,835 | 7/1969 | Hochgesand ........................... 62/27 |
| 3,813,889 | 6/1974 | Allam et al. ........................... 62/22 |
| 3,886,756 | 6/1975 | Allam et al. ........................... 62/17 |
| 4,102,659 | 7/1978 | Martin ................................... 62/17 |

Primary Examiner—Norman Yudkoff
Attorney, Agent, or Firm—Alvin H. Fritschler

[57] ABSTRACT

An improvement in a wash system for gas separation wherein a wash liquid is contacted countercurrently with a feed gas mixture containing a high volatility component and a low volatility component in a plate and fin type exchanger where the heat of absorption is removed by a refrigerant passed in indirect heat exchange relationship with the countercurrently flowing feed gas mixture and wash liquid and then passing the resulting product stream to a wash column to further purify the product stream.

4 Claims, 1 Drawing Figure

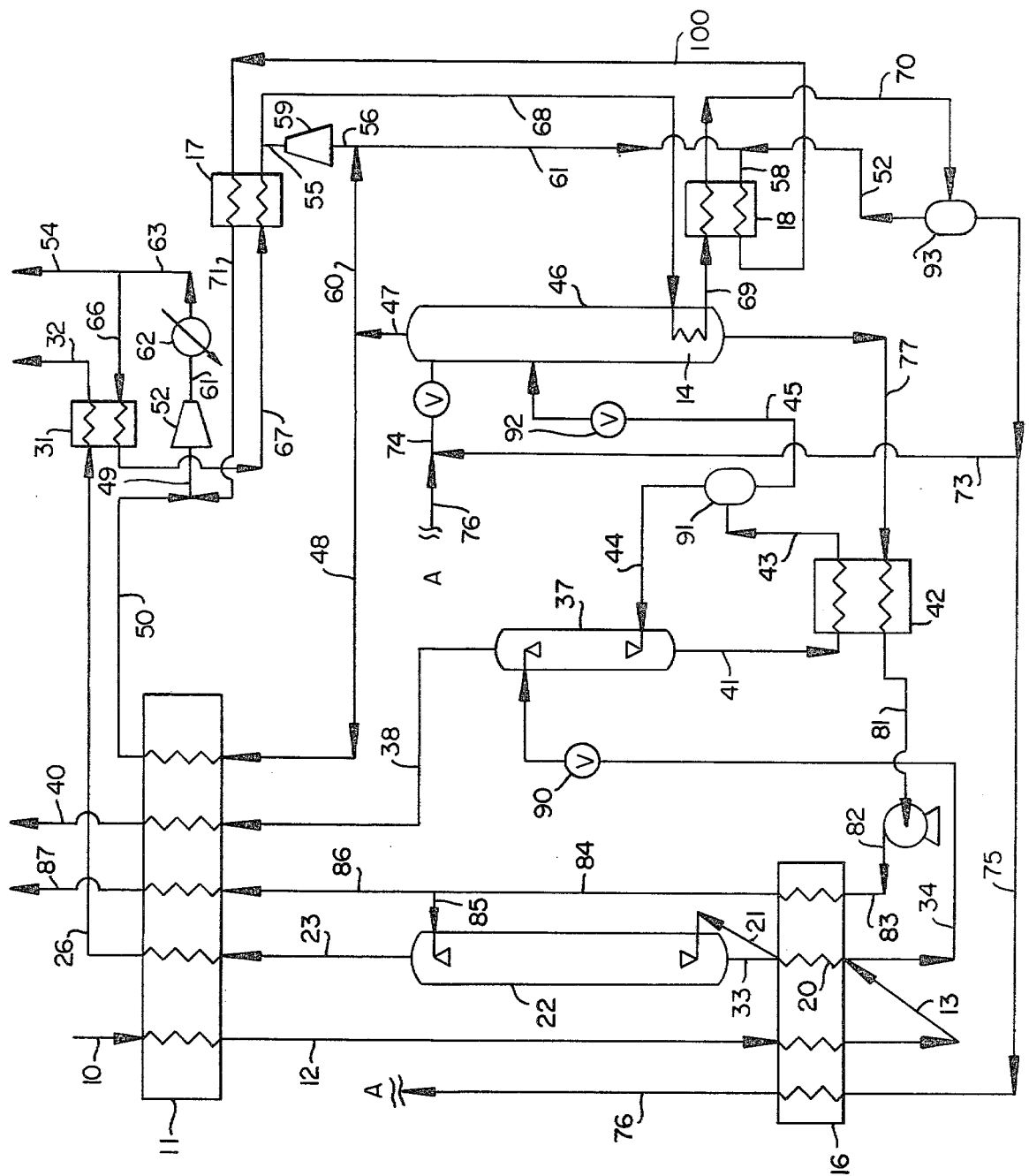

WASH SYSTEM GAS SEPARATION

FIELD OF INVENTION

This invention relates to an improved process for the separation of a gas mixture containing a high volatility component such as hydrogen or helium and a low volatility component such as carbon monoxide or nitrogen and more particularly to a methane wash process for separating carbon monoxide and hydrogen in a synthesis gas feed mixture.

BACKGROUND OF THE INVENTION

Synthesis gas is commonly produced in the chemical processing industry by a variety of techniques including, but not limited to, the steam reforming of natural gas, and the pyrolysis or partial oxidation of both solid and liquid hydrocarbon feedstocks. The synthesis gas mixture so-produced typically contains the desired hydrogen and carbon monoxide products as well as residual methane. By way of example, a synthesis gas mixture may contain (on a dry basis) approximately 40–80 mol. % hydrogen, 15–60 mol. % carbon monoxide, 0.1–15 mol. % methane and the remainder argon and nitrogen. Consistent with the use of the synthesis gas constituents as chemical precursors, the three major components, hydrogen, carbon monoxide, and methane, are separated and purified to the required degree. Both cryogenic and non-cryogenic processes are available for the required separations and each offer their own advantages. The present invention is concerned primarily with the cryogenic approach.

In the past, there have been two basic cryogenic approaches to the complete separation of synthesis gas; the methane wash approach and the partial condensation-PSA approach. The present invention is based on the methane wash approach. In the basic methane wash approach, a synthesis gas feed stream is provided at an elevated pressure, cooled and introduced to a methane wash column. Prior to the methane wash column, the hydrogen content of the feed gas steam may be increased by the condensation of less volatile constituents. In the wash column, the feed is contacted with a high purity, subcooled methane wash liquid. These two streams pass countercurrently to one another in the methane wash column and the methane wash liquid absorbs carbon monoxide from the upwardly flowing synthesis gas stream. A high purity hydrogen product is recovered as an overhead stream from the methane wash column and a methane-rich liquid containing the absorbed carbon monoxide is recovered as a bottoms liquid.

The recovered bottoms liquid is then reduced in pressure and fractionated in a regeneration or carbon monoxide separation column. This column produces an overhead carbon monoxide product and a high purity methane bottoms liquid. The regeneration column is provided with a carbon monoxide-rich reflux liquid; while boil-up for the regeneration column is provided by appropriate heat exchange with the methane bottoms liquid. A portion of the methane bottoms is then subcooled, repressurized and recycled to the methane wash column as the methane wash liquid.

In a recent improvement to the basic methane wash approach for synthesis gas separation disclosed in U.S. Pat. No. 4,102,659 by J. R. Martin, it has been shown that by stripping the bottoms liquid recovered from the methane wash column with a hydrogen-rich vapor in a separate gas-liquid contacting zone that the overall recovery and purity of the carbon monoxide product may be significantly improved.

While this system represents a substantial improvement in the methane wash synthesis gas separation art, one major problem nevertheless remains. In the methane wash system, carbon monoxide is removed from the synthesis gas stream by absorption into a subcooled, high purity methane wash liquid. This absorption of carbon monoxide from the synthesis gas stream by the methane wash liquid is unavoidably accompanied by the release of heat (i.e., the heat of solution or absorption). The methane wash liquid acts as a heat sink and will experience a temperature rise consistent with its flow rate and specific heat. Any rise in the temperature of the methane wash liquid will tend to degrade the purity of the hydrogen product recovered as overhead from the methane wash column. To offset this product purity degradation, the prior art has generally relied upon the adjustment of the temperature and flow rate of the methane wash liquid (i.e., by operating at a high methane wash liquid flow rate and at as low a temperature as possible). In this way, the effect on hydrogen product purity of this heat generation is significantly reduced. However, the need to produce this large source of subcooled methane wash liquid places a substantial power demand on the process. In today's energy deficient climate, this power demand represents a significant economic disadvantage.

PRIOR ART

U.S. Pat. No. 3,813,889: Allam et al illustrates one potential solution to this problem. In the Allam et al system, the synthesis gas stream is first treated in an isothermal contacting zone. In this contacting zone, a large fraction of the carbon monoxide content of the synthesis gas stream is absorbed by a methane wash liquid; while the heat of absorption accompanying the carbon monoxide removal is simultaneously removed by indirect heat exchange with a refrigerant stream. The carbon monoxide depleted synthesis gas stream recovered from the isothermal contacting zone is then fed to a conventional adiabatic, methane wash column for final treatment. Since a major fraction of the carbon monoxide has already been removed from the synthesis gas stream, the heat effects in the methane wash column will be substantially reduced and a much lower flow rate of methane wash liquid may be employed. As a result, this process is able to realize a significant power reduction relative to the conventional methane wash approach.

The isothermal contacting zone of the Allam et al system consists of a multiplate gas-liquid contacting column having a cooling coil associated with each plate, superimposed above a plurality of serially arranged contactor-exchangers and gas-liquid phase separators. The synthesis gas stream is first passed serially through the plurality of alternating contactor-exchangers and gas-liquid phase separators, and is then flowed upwardly through the multiplate contacting column provided with the cooling coils. A methane wash liquid recovered from the bottom of a conventional methane wash column is introduced into the top of the multiplate gas-liquid contacting column and passes downwardly, countercurrently to the upwardly flowing synthesis gas stream. The methane wash liquid recovered from the bottom of this multiplate gas-liquid contacting column is then passed through the plurality of alternating contactor-exchangers and gas-liquid phase separators in a direction countercurrent to the progression of the synthesis gas stream. However, it should be emphasized that this flow of the synthesis gas stream and the methane wash liquid is concurrent in each contactor-exchanger. The heat of absorption generated within the multiplate gas-liquid contacting column is removed by a refrigerant stream circulated through the cooling coils situated on each of the plates. The heat of absorption generated within the plurality of contactor-exchangers is removed by indirect heat exchange with a refrigerant stream circulating within each contactor-exchanger.

The Allam et al system, however, has merely exchanged one problem for another. Although the Allam et al system provides a sizeable power reduction relative to the conventional methane wash system, the method for achieving this result is extremely complex. In the first place, the Allam et al system requires a plurality of the contactor-exchangers, which as disclosed in lines 2-3 of column 3 are constructed on the well-known aluminum plate-fin matrix principal. This number of plate and fin heat exchangers represents a sizeable expense. Moreover, the Allam et al system further requires a multiplate gas-liquid contacting column having each plate fitted with an individual cooling coil. One of normal skill will readily appreciate that this construction adds further expense to an already costly system.

U.S. Pat. No. 1,773,012: Shuftan. This patent pertains to the separation of coke oven gas, containing nitrogen, carbon monoxide, methane and hydrogen. The vapor from separator 2 enters reflux condenser 3 and flows upwardly through appropriate passages in the condenser. As this gas flows upwardly, a methane liquid is condensed within the condenser and flows downwardly against the upwardly flowing gas. Refrigeration is provided by a warming liquid methane and a warming hydrogen gas stream.

It is to be noted, however, that the operation of this reflux condenser differs significantly from the operation of the reflux condenser of this invention. For example, the Schuftan system does not provide any external reflux to the reflux condenser. In other words, the only reflux liquid available for the reflux condenser is that liquid which is actually condensed therein. This process design limitation significantly reduces the flexibility, as well as the carbon monoxide removal potential, of the exchanger. Moreover, the reflux condenser in the Schuftan invention is purposely operated to prevent the washing of carbon monoxide from the upwardly flowing gas stream, and instead generates a pure methane liquid to be used as the wash liquid in column 4. In this regard, see especially page 2, line 38-48. As a result, Schuftan actually teaches away from the method of this invention.

The second aspect of the Schuftan invention, is the gas washing column 4. Column 4 illustrates at least an attempt at an isothermal countercurrent contacting of a synthesis gas and a methane wash liquid. As shown in this figure, the heat of absorption is removed from this column by a boiling nitrogen refrigerant introduced through heat exchanger coil 5. However, the area available for heat transfer in this design is rather limited, and as a result very little, if any, improvement in the separation would be realized. Moreover, this arrangement is more akin to the cooling coil-fitted tray column used by Allam et al.

U.S. Pat. No. 2,591,658: Haringhuzen. This patent shows what is a heat exchanger E of FIGS. 1 and 2 as a reflux condenser. A gas feed containing methane, carbon monoxide and hydrogen is fed into this exchanger through conduit 5, (see FIG. 2) while a hydrogen gas is recovered as an overhead in conduit 7 and a carbon monoxide-containing methane liquid is recovered as bottoms in conduit 10. As shown, this condenser is driven by boiling liquid nitrogen, and as in the prior reference there is no independent supply of reflux to the condenser.

SUMMARY OF THE INVENTION

For purposes of description, reference will be made to the separation of hydrogen and carbon monoxide in a syn-gas feed stream. The invention is not so limited.

According to this invention, a cooled synthesis gas feed stream for the methane wash column is first passed upwardly through a plate and fin heat exchanger countercurrently to a downwardly flowing wash liquid. The wash liquid comprises the methane-rich bottoms liquid from the methane wash column. The cooled synthesis gas stream and the wash liquid are flowed through the same passages in the plate and fin heat exchanger. The plate and fin heat exchanger is also supplied with a refrigerant stream, which in the case of synthesis gas separation can conveniently comprise a carbon monoxide rich liquid. The refrigerant stream flows in indirect heat exchange relationship with the upwardly flowing cooled synthesis gas stream and the downwardly flowing wash liquid. The refrigerant stream removes a major portion of the heat of absorption released during the contracting of the cooled synthesis gas stream and the wash liquid. By this method, a major portion of the refrigeration duty of the methane wash system is shifted from the wash liquid itself to the refrigerant stream, thereby permitting a sizeable power reduction. The present invention provides a very cost effective method for achieving this power reduction.

BRIEF DESCRIPTION OF THE DRAWINGS

The sole FIGURE is a schematic flow sheet of a separation process according to the preferred embodiment of this invention, in which refrigeration for the process is provided by carbon monoxide expansion and a carbon monoxide heat pump cycle.

DESCRIPTION OF THE PREFERRED EMBODIMENT AND BEST MODE

Referring now to the drawing process description will be based on a feed gas mixture introduced at a flow rate of 1000 lb.mol./hr. through line 10 at a pressure of about 195 psia and a temperature of 280° K., having approximately the following molar composition: hydrogen=79.8%, nitrogen=0.2%, carbon monoxide=15.8% and, methane=4.2%.

In the process of the present invention, the feed gas should preferably have a pressure of at least 150 psia in order to provide sufficient pressure to accomodate the subsequent processing steps.

The feed gas mixture entering in line 10 is partially cooled in heat exchanger 11 by heat exchange with other process streams flowed therethrough and is withdrawn through line 12. The partially cooled feed gas mixture is then further cooled to 94° K. in heat exchanger 16 to provide cooled feed gas mixture which comprises the feed gas for the methane wash column 22. This cooled gas mixture in conduit 13 is first introduced into a plurality of the heat exchange passages, (schematically represented by passage 20) of the plate and fin heat exchanger 16. The cooled gas mixture flows upwardly through the passages 20 and is withdrawn from the heat exchanger 16 through line 21. The feed gas mixture in line 21 is then introduced into the lower section of the methane wash column 22, which may suitably comprise a multiplate column of a conventional design.

The cooled gas mixture flowing upwardly through the passages 20 of heat exchanger 16 is countercurrently contacted with a methane wash liquid which is introduced into the same passages of heat exchanger 16 through conduit 33. This countercurrent contacting of the methane wash liquid, introduced into heat exchanger 16 through line 33, and the cooled feed gas mixture, introduced into heat exchanger 16 through line 13, causes carbon monoxide in the feed gas mixture to be absorbed into the downwardly flowing methane wash liquid. The heat generated as a result of this contacting is simultaneously removed in this embodiment by a boiling carbon monoxide rich liquid introduced into the plate and fin heat exchanger 16 through line 75 and subsequently withdrawn from heat exchanger 16 through line 76. By this method, the contacting of the methane wash liquid and the cooled feed gas mixture occurs isothermally in heat exchanger 16.

In the first absorption zone 22, the partially carbon monoxide depleted feed gas mixture in conduit 21 is countercurrently contacted with a high purity methane wash liquid introduced into the upper section of the absorption zone through line 85. A high purity hydrogen gas is recovered as overhead in line 23 and a bottoms liquid comprising the carbon monoxide-containing methane wash liquid is recovered in line 33. As noted previously, the carbon monoxide containing methane wash liquid is then passed through the heat exchanger 16 and countercurrently contacted with the cooled feed gas mixture.

The overhead hydrogen gas is withdrawn from the absorption zone in line 23 at a flow rate of 799 lb.mol./hr., a pressure of 180 psia and a temperature of 93° K. The high purity hydrogen gas contains 98.5 mol. % hydrogen, 270 ppm nitrogen 18 ppm carbon monoxide and 1.4 mole % methane. The high purity hydrogen gas is then passed into the heat exchanger 11 for partial warming thereof by heat exchange with the feed gas mixture. The partially warmed high purity hydrogen gas is discharged from heat exchanger 11 in line 26 and passed to heat exchanger 31 for further warming therein to about ambient temperature and is subsequently removed from the process as the warm hydrogen product gas in line 32.

After the bottoms liquid from the methane wash column 22 in line 33 has been contacted with the cooled feed gas mixture in heat exchanger 16, a carbon monoxide impurity-containing liquid is recovered in line 34 at a flow rate of 682 lb.mol./hr. and a temperature of 92° K. This stream contains 75 mol. % methane, and 23 mol. % carbon monoxide. The bottoms liquid in conduit 34 is throttled through valve 90 into the second absorption zone 37. The throttled carbon monoxide impurity-containing methane liquid is countercurrently contacted with a hydrogen rich vapor at a liquid to vapor molar flow ratio of at least 10, for absorption of carbon monoxide from the hydrogen rich vapor by the throttled bottoms liquid. A residual hydrogen gas is recovered as overhead and a liquid enriched in carbon monoxide is recovered as bottoms. The liquid withdrawn from the second absorption zone 37 in line 41 is partially vaporized in heat exchanger 42 against a cooling methane-rich liquid. The partially vaporized liquid from heat exchanger 42 is passed through conduit 43 to vapor-liquid phase separator 91, from which the separated gaseous fraction is recirculated to the second absorption zone through line 44 as the hydrogen-rich vapor therefore.

The residual hydrogen gas obtained as overhead from the second absorption zone in line 38 flows to heat exchanger 11 at a flow rate of 13 lb.mol./hr., a pressure of 60 psia and a temperature 92° K. This stream has a molar composition of 70.1% hydrogen, 26.5% carbon monoxide and 2.8% methane. This gas is introduced into heat exchanger 11 and is warmed by heat exchange with the cooling feed gas mixture. After warming, this gas is recovered from the process in line 40 and may for example be used as a fuel gas having a moderately high Btu heating value.

The bottoms liquid separated in phase separator 91 is withdrawn therefrom in line 45 as second absorption zone bottoms liquid at a flow rate of 670 lb.mol.hr., and a temperature of 106° K. This recovered bottoms liquid is then passed through line 45, throttled through valve 92 to a pressure of about 21 psia and is introduced at an intermediate point to fractionation zone 46.

In the fractionation zone 46, the bottoms liquid recovered from the phase separator 91 is fractionated to recover an overhead carbon monoxide gas in line 47 and a methane bottoms liquid in line 77. The overhead gas is withdrawn from fractionation zone 46 at a flow rate of 231 lb.mol./hr., a pressure of 21 psia, a temperature of 85° K. and a molar composition of 98.15% carbon monoxide, 1.5% nitrogen, 0.2% methane and 0.15% hydrogen. The bottoms liquid is withdrawn from fractionation zone 46 at a flow rate of 511 lb.mol./hr., a pressure of 23 psia, a temperature of 117° K. and a composition of substantially pure methane, containing only about 15 ppm carbon monoxide.

Reflux for the fractionation zone 46 is provided by the direct introduction of a carbon monoxide liquid to the top of the fractionation zone through line 74. This liquid originates in the phase separator 93, to be more fully described hereafter. Reboiled vapor for the fractionation zone is provided by vaporizing the bottoms liquid by heat exchange with a cooling carbon monoxide stream introduced into the reboil coil 14 through line 68.

The methane bottoms liquid recovered from the fractionation zone 46 is passed through line 77 to heat exchanger 42 and heat exchanged therein with the bottoms liquid withdrawn from the second absorption zone 37. A cooled methane liquid withdrawn from heat exchanger 42 in line 81 is then pumped to a higher pressure by pump 82 and passed to heat exchanger 16 through line 83. This methane liquid in the line 83 is subsequently further cooled in heat exchanger 16. A subcooled methane liquid is then removed from heat exchanger 16 through line 84. The major portion of this liquid is then introduced into the methane wash column through line 85 as the methane wash liquid therefore. The remaining portion of the subcooled methane liquid is passed through line 86 to heat exchanger 11 where it helps to cool the feed gas mixture in line 10. A high purity methane gas containing about 99.9% methane is recovered in line 87 at a pressure of 40 psia and a flow of 30 lb.mol./hr.

Return now to the carbon monoxide overhead gas recovered from the fractionating zone 46. This gas is split into two streams in lines 48 and 60. The gas in line 48 is first passed to heat exchanger 11. This gas is warmed against the cooling feed gas mixture in heat exchanger 11 and is then discharged through line 50. The gas in line 50 is mixed with additional carbon monoxide gas in line 71, and is then passed through line 49 to the compressor 52 for pressurization therein. Compressor 52 may typically comprise a three stage centrifical compressor of known design.

The carbon monoxide gas introduced into the compressor 52 is compressed to a pressure of 295 psia and is withdrawn through line 61 at a flow rate of 686 lb.mol./hr. This gas is cooled in water chiller 62 and is withdrawn from chiller 62 through line 63. One portion of this gas is then passed through line 66 to the heat exchanger 31. The other portion of the compressed carbon monoxide gas is withdrawn through line 54 as carbon monoxide product at a pressure of 295 psia and a flow rate of 158 lb.mol./hr.

The compressed carbon monoxide gas in line 66 is cooled in heat exchanger 31 and is then passed through line 67 for further cooling in heat exchanger 17. After partial cooling in heat exchanger 17, one portion of this gas is withdrawn through line 68 and is introduced into reboil coil 14 for condensation therein. The condensed carbon monoxide gas is withdrawn from reboil coil 14 through line 69 and is introduced into heat exchanger 18 for further cooling so as to produce a subcooled carbon monoxide liquid stream. This subcooled carbon monoxide fluid is then passed through line 70, and is flashed into the phase separator 93.

The other portion of the gas withdrawn from heat exchanger 17 is introduced into the expansion turbine 59 through conduit 55 so as to develop additional refrigeration for the process. A cooled and expanded carbon monoxide gas is withdrawn from turbine 59 through line 56 and is mixed with the other portion of the carbon monoxide gas recovered from the fractionation zone 46 in line 60. This gas mixture in conduit 61 is then mixed with the overhead gas recovered from phase separator 93 in line 57. This gas mixture is then passed to heat exchanger 18 through line 58 for partial warming. The partially warmed gas mixture is then passed through line 100 to heat exchanger 17 for further warming against cooling carbon monoxide gas. A warm carbon monoxide gas mixture is then recovered in line 71 and is mixed with the carbon monoxide gas in line 50 as hereinabove described. One part of the carbon monoxide liquid recovered from phase separator 93 is used to provide reflux to the fractionation zone 46 through lines 73 and 74. The other part of this liquid provides cooling in heat exchanger 16 via line 75 as previously described. The carbon monoxide liquid in conduit 75 is at least partially vaporized within heat exchanger 16, withdrawn through line 76 and mixed with the cooled and condensed carbon monoxide fluid in line 73.

The essence of the present invention resides in the novel use of heat exchanger 16 in connection with the methane wash column 22. In effect, the methane wash column of a typical prior art system has been separated into two subsystems, an isothermal section corresponding to the heat exchanger 16 and a substantially adiabatic section corresponding to the methane wash column 22. The bulk of the separation of carbon monoxide from the feed gas mixture occurs in the isothermal section wherein the methane wash liquid in conduit 33 is contacted countercurrently with the feed gas mixture introduced through line 13. The unavoidable heat of absorption accompanying this contacting is simultaneously removed by the boiling carbon monoxide liquid introduced into heat exchanger 16 through line 75. The contacting step in heat exchanger 16 reduces the carbon monoxide concentration of the cooled feed gas in line 13 from about 15.8% to about 0.75% in line 21. This residual carbon monoxide concentration is then reduced to the ppm level in the adiabatic section corresponding to the methane wash column 22.

A key aspect of this invention is the use of a conventional plate and fin heat exchanger as heat exchanger 16 of the isothermal section. As described above, the cooled feed gas mixture and the methane wash liquid are flowed countercurrently to one another through a plurality of passages of heat exchanger 16. A refrigerant stream is then passed through other passages of the heat exchanger to remove the heat of absorption generated during the contacting step. To allow this countercurrent flow of liquid and gas through the same passages of the plate and fin heat exchanger, special care must be observed in its design. In particular, the cross-sectional flow area of the passages through which the gas and liquid are flowing concurrently to one another must be large enough so that the gas flow velocity through the passages is sufficiently low so as not to entrain the methane wash liquid introduced into the top of the exchanger. In this way, stable operation can be successfully maintained. This provision is not normally a standard design feature of a plate and fin heat exchanger.

COMPARATIVE DATA AND EXAMPLES

A power comparison of the prior art Martin process, U.S. Pat. No. 4,102,659, with the process of this invention was made. In each case, the system processes 1000 lb.mol./hr. of a feed gas having a molar concentration of 79.8% hydrogen, 15.8% carbon monoxide, 4.2% methane and residual nitrogen at a pressure of 195 psia and a temperature of 280° K. The Martin process produces a hydrogen product having a hydrogen composition of 98.5% with a 1.5% impurities at a flow rate of 797 lb.mol./hr., a pressure of 180 psia and temperature of 305° K. The Martin process also produces a carbon monoxide product having a carbon monoxide concentration of 98.15% and impurities of 1.85%. The carbon monoxide product is produced at a rate of 154 lb.mol./hr., a pressure of 295 psia and a temperature of 311° K. The process of this invention produces a hydrogen product having a molar concentration of 98.5% hydrogen and 1.5% impurities. The hydrogen product is produced at a flow rate of 799 lb.mol./hr., a pressure of 180 psia and a temperature of 305° K. The process of this invention also produces a carbon monoxide product having a molar composition of 98.15% carbon monoxide with 1.85% impurities. The carbon monoxide product is produced at a flow rate of 158 lb.mol./hr., a pressure of 295 psia and a temperature of 311° K. Refrigeration for the Martin process was provided by a carbon monoxide heat pump cycle and carbon monoxide expansion; as was refrigeration for the process of this invention. The minor flow rate differences do not affect the power comparison. The present invention provides a 25% power advantage relative to the prior art Martin process.

An economic analysis of the present invention and the Allam et al prior art was made.

The major process distinction between the two systems, is the countercurrent flow of methane wash liquid feed gas in the plate and fin heat exchangers of the present invention and the concurrent flow of these same streams in the plate and fin heat exchangers of the Allam et al system. By employing countercurrent flow, the present system is able to condense the column/contactor-exchangers/phase separator's assembly of Allam et al into a single exchanger. A significant savings in equipment is realized. For example, the isothermal contacting section of the Allam et al design would cost in excess of about 40% more than the isothermal contacting section of the present invention and, primarily because of the cooled-tray column construction, would be more structurally complex. If the column is eliminated from the isothermal contacting section of the Allam et al design and instead additional contactor-exchangers and phase separators are employed, while the complexity may be reduced the overall cost would be increased by an additional 15%.

Having described the invention with reference to a preferred embodiment and best mode of operation it should be understood that modification may be made to such embodiment and the invention is not so limited but is clearly defined by the following claims.

What is claimed is:

1. In a process for the separation of a gas mixture containing a high volatility component and a low volatility component comprising the steps of
    (a) cooling said gas mixture;
    (b) countercurrently contacting said cooled gas mixture with a wash liquid having a volatility below the low volatility component in a substantially adiabatic absorption zone to absorb the low volatility component and pass the high volatility as overhead product and the mixture of wash liquid and low volatility component as a bottoms liquid;
    (c) reducing the pressure of the bottoms liquid from the absorption zone;
    (d) fractionating the bottoms liquid recovered from the absorption zone in a fractionation zone to recover an overhead gas comprising the low volatility component and bottoms liquid comprising the wash liquid;
    (e) recirculating at least part of the bottoms liquid recovered from the fractionation zone as the wash liquid for the absorption zone;
    the improvement which comprises:
        (i) passing the cooled gas mixture of step (a) upwardly through a plurality of passages of an isothermal absorption zone for removal of a major portion of the low volatility component prior to passage to said adiabatic absorption zone;
        (ii) simultaneously passing the bottoms liquid of step (b) downwardly through the same passages of said isothermal absorption zone as is flowing the cooled gas mixture;
        (iii) maintaining a relative flow velocity between the upward passing cooled mixture and the downwardly passing bottoms liquid so as to avoid liquid entrainment;
        (iv) passing a refrigerant stream in indirect heat exchange relationship with the upwardly passing cooled mixture and the downwardly passing bottoms liquid whereby the unavoidable heat of absorption accompanying the gas-liquid in the isothermal absorption zone is removed prior to passage of said gas mixture to said adiabatic absorption zone.

2. The process according to claim 1 wherein the gas mixture is synthesis gas, the wash liquid is methane, the high volatility component is hydrogen and the low volatility component is carbon monoxide.

3. The process according to claim 1 in which said isothermal absorption zone comprises a plate and fin heat exchanger.

4. The process according to claim 3 wherein the plate and fin heat exchanger has passages the cross sectional area of which permit low upward gas floe velocity so as not to entrain the wash liquid introduced into the top of the exchanger.

* * * * *